April 19, 1966  B. KAZAN  3,247,390
ELECTROLUMINESCENT DEVICE
Filed Dec. 1, 1955  7 Sheets-Sheet 1

INVENTOR.
Benjamin Kazan
BY
William A. Balesak
ATTORNEY.

April 19, 1966  B. KAZAN  3,247,390
ELECTROLUMINESCENT DEVICE
Filed Dec. 1, 1955  7 Sheets-Sheet 3

INVENTOR.
*Benjamin Kazan*
BY
*William A. Zalesak*
ATTORNEY.

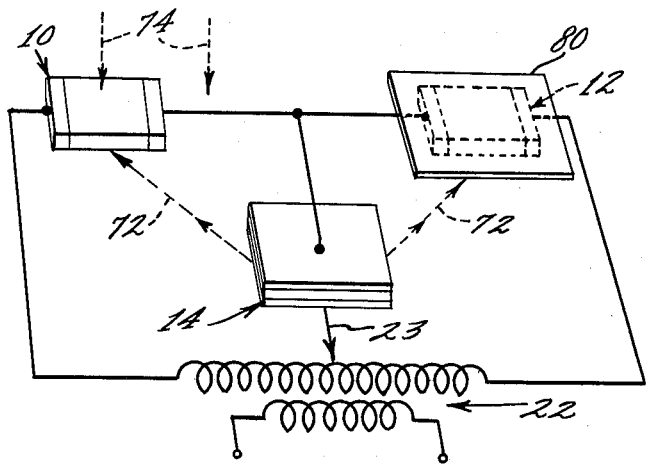
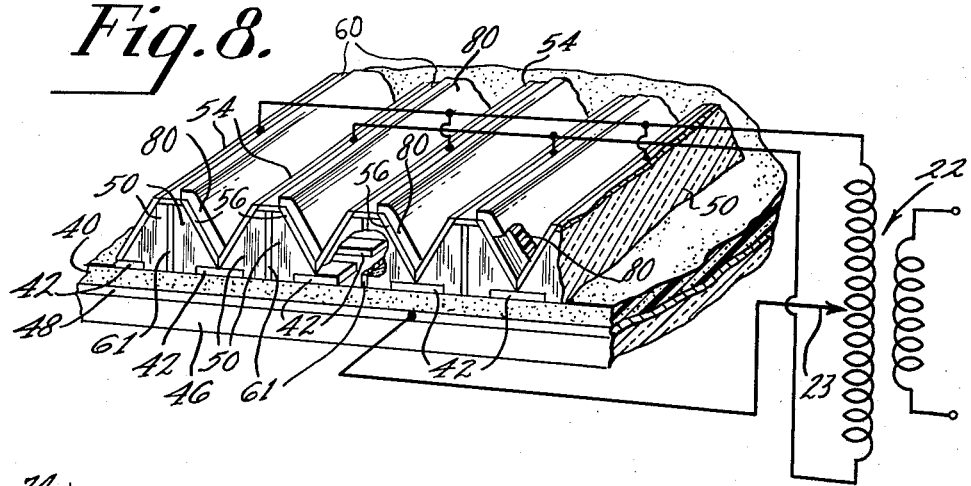
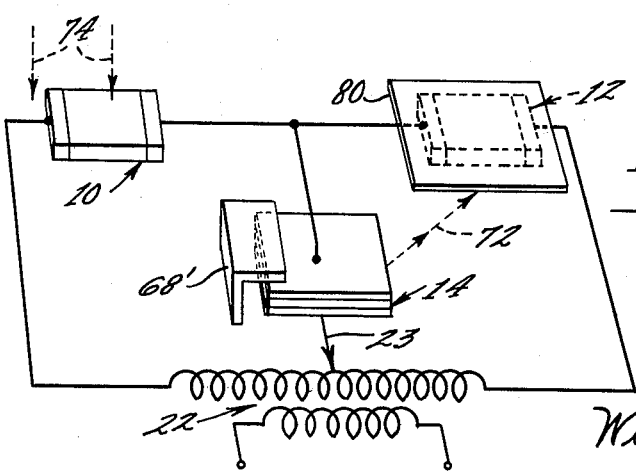

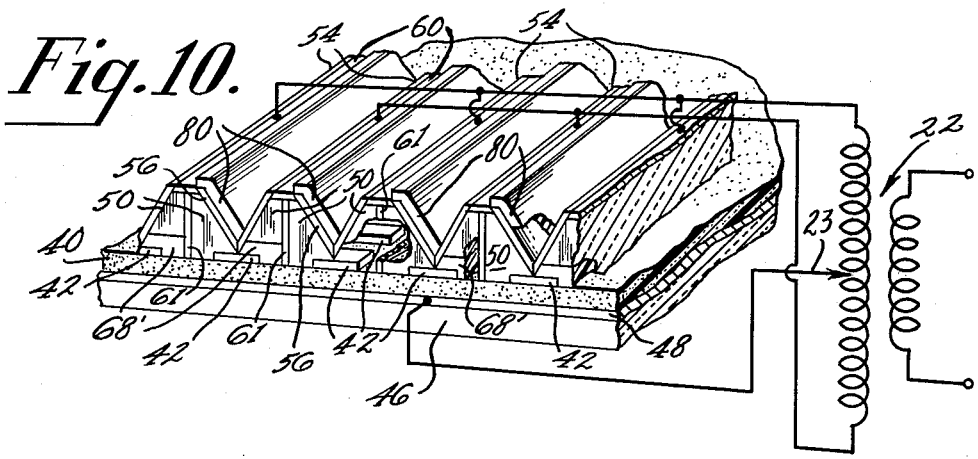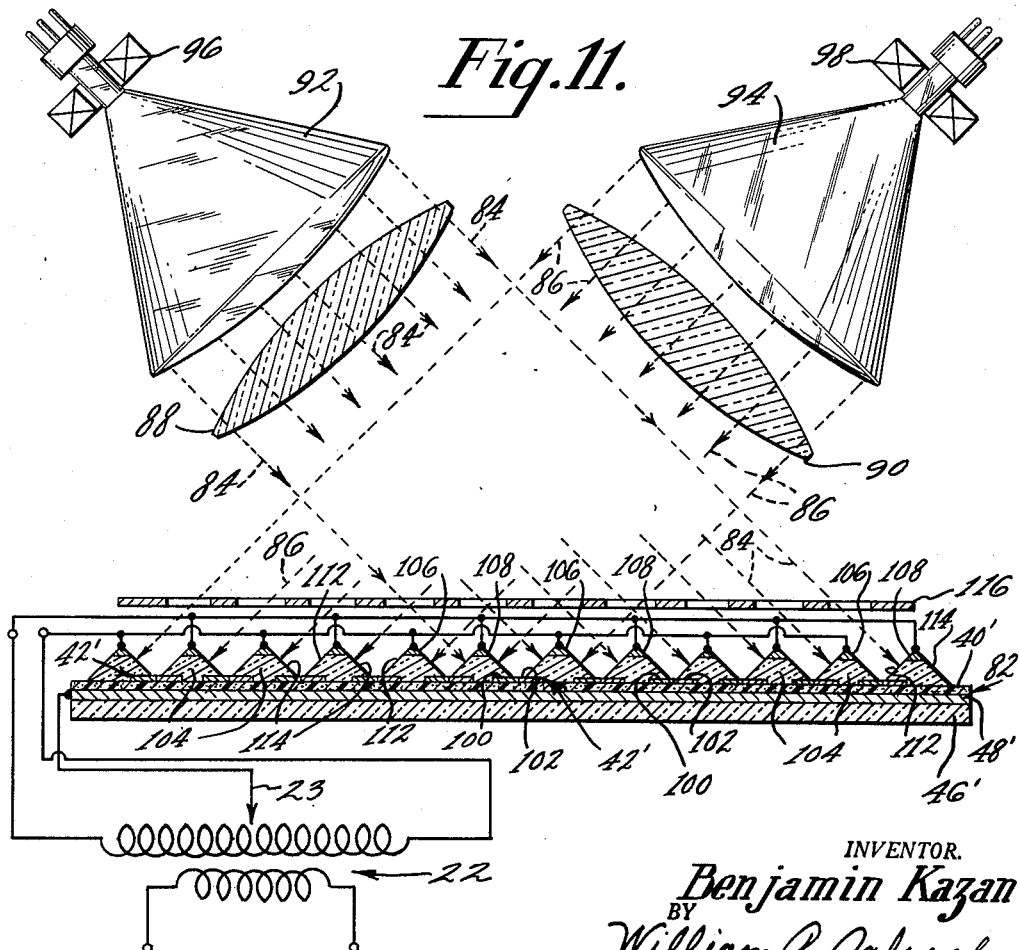

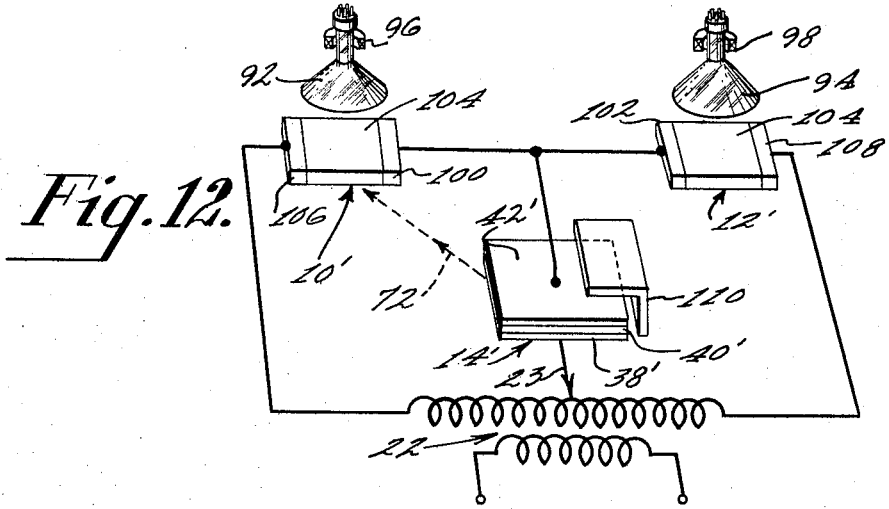

April 19, 1966  B. KAZAN  3,247,390
ELECTROLUMINESCENT DEVICE
Filed Dec. 1, 1955  7 Sheets-Sheet 7

INVENTOR.
Benjamin Kazan
BY
William A. Zalesak
ATTORNEY.

United States Patent Office 3,247,390
Patented Apr. 19, 1966

3,247,390
ELECTROLUMINESCENT DEVICE
Benjamin Kazan, Princeton, N.J., assignor to Radio Corporation of America, a corporation of Delaware
Filed Dec. 1, 1955, Ser. No. 550,417
22 Claims. (Cl. 250—213)

This invention relates to an electroluminescent device, and particularly to such a device having signal storage properties.

It is known that many phosphor materials can be caused to luminesce by subjecting them to a varying electric field or current. These phosphor materials are commonly referred to as electroluminescent materials. While several theories explaining the phenomenon of electroluminescence have been advanced, none of them have proven entirely satisfactory. However, it appears that the electroluminescent phenomenon is a result of a re-distribution of electrons in the structure of the electroluminescent material when the material is subjected to the varying electric field or current. The visible radiant energy emitted by the material seems to be a result of emission due to this re-distribution of electrons.

Electroluminescent devices are known which are capable of retaining or storing an image for any desired length of time. However, these devices are incapable of removing or discharging less than the entire image. In these devices no provision is made for selectively removing a desired portion of the stored image and retaining other portions. However, there are occasions when it is desirable to erase one portion of a stored image without affecting other portions of the image. For example, if a stored image represents a memory device in a computor system, it may be desirable to remove part of the memory without affecting other portions of the stored information. Also, in radar receiving systems it is often desirable to store incoming signals in visible form as they are received and at the same time remove previously stored signals, the previously stored signals being retained until after the new signal is stored. Alternatively, it is sometimes desirable to display on a radar indicator only targets which are moving faster than a given rate of speed. For example, it may be desirable to display a moving projectile without displaying adjacent airplanes which are moving at a lower velocity than the projectile, or to display a moving airplane without the fixed landmarks around it.

Accordingly, it is an object of the invention to provide an improved device capable of storing a radiant energy signal and wherein the duration of signal storage is controllable by radiant energy received by the device.

It is another object of this invention to provide an improved electroluminescent device useful in storing signals in the form of images.

It is yet another object of the invention to provide an improved electroluminescent device capable of selective erasure.

It is still another object of the invention to provide an improved electroluminescent device capable of selectively displaying only signals which change at a speed higher than a predetermined rate.

The foregoing and related objects are achieved in accordance with the invention by providing an electroluminescent device comprising two photoconductive elements and an electroluminescent element. The two photoconductive elements are connected in electrical series, and a terminal of the electroluminescent element is connected to the junction of the two photoconductive elements. When one of the photoconductive elements and the electroluminescent element are connected in series across a voltage source, and light causes it to conduct electricity, a voltage flows across the electroluminescent element causing it to luminesce. If the electroluminescent element is optically coupled to the photoconductive element in regenerative relation, the electroluminescent material, once activated, will continue to luminesce. Thus the information represented by the light is stored. The second photoconductive element and the electroluminescent element are connected in series across a voltage source which is substantially 180° out of phase with the first voltage source. When the second photoconductive element is changed to its conductive state, that is when light impinges on it, current from the second voltage source will also be applied to the electroluminescent element. Since the two voltages are of opposite phase, the net voltage applied to the electroluminescent element is zero. Therefore, the electroluminescent element ceases to luminesce. An array of such electroluminescent devices or units may be arranged in the form of a panel, each unitary device in the array serving to store elemental portions of the image to be stored in the array.

The invention is described in greater detail in connection with the accompanying drawings wherein.

Figure 3:
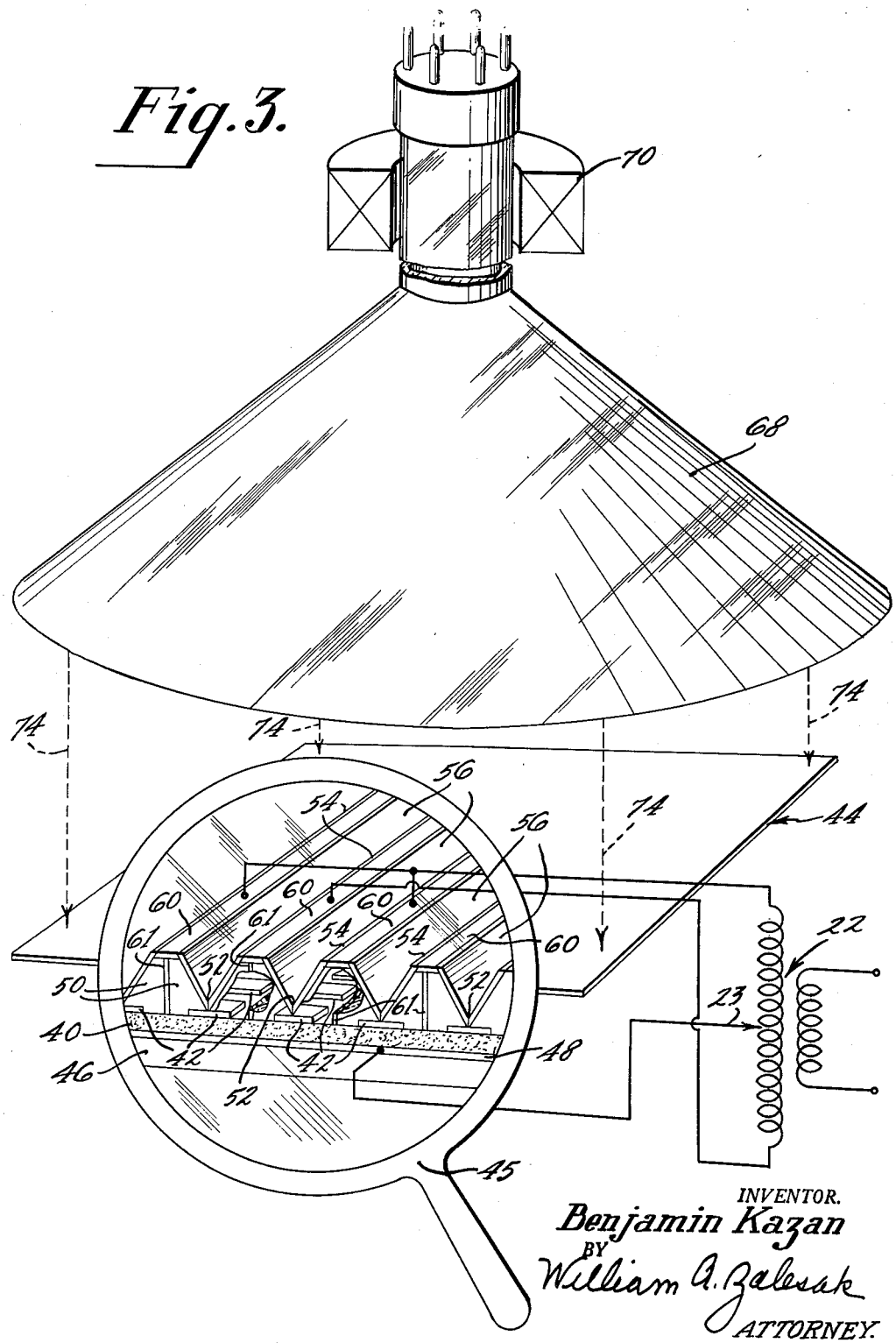
FIG. 3 is a perspective view of an electroluminescent panel, of a type comprising a plurality of the devices of FIG. 2, illuminated by a single source of radiant energy and showing an enlarged view of some of the electroluminescent devices thereof.
Figure 4:
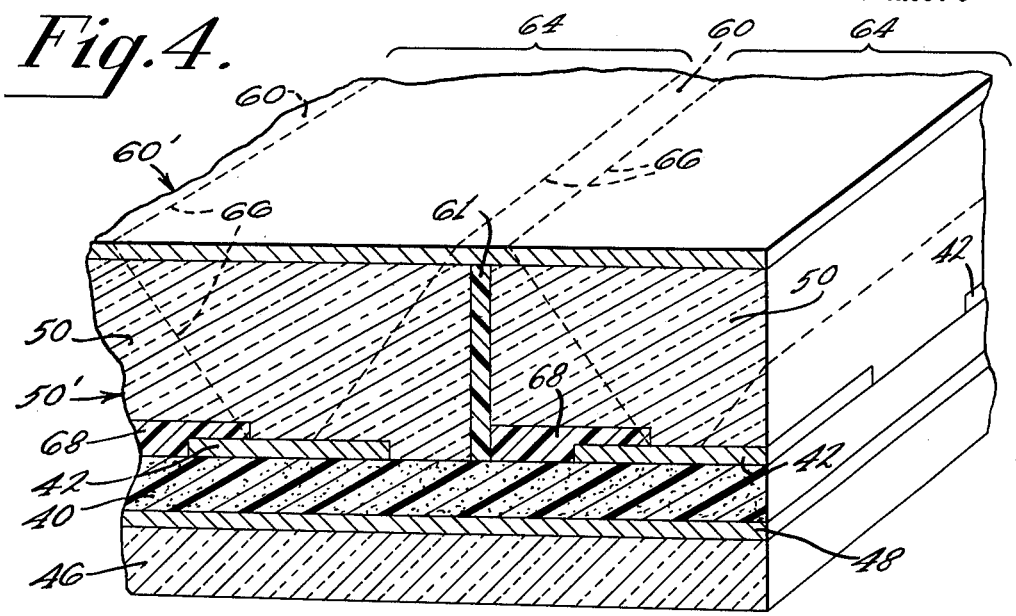
FIG. 4 is a perspective view of the panel of FIG. 3 during a step in its manufacture.
Figure 5:
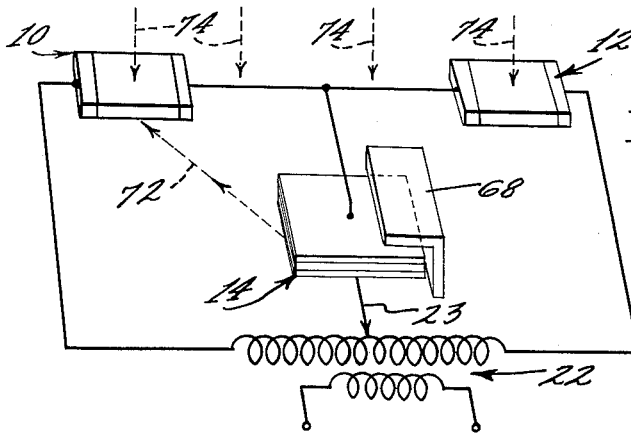
Figure 6:
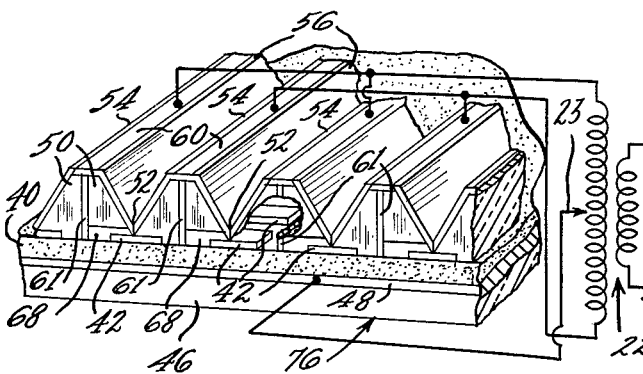
Figure 14:
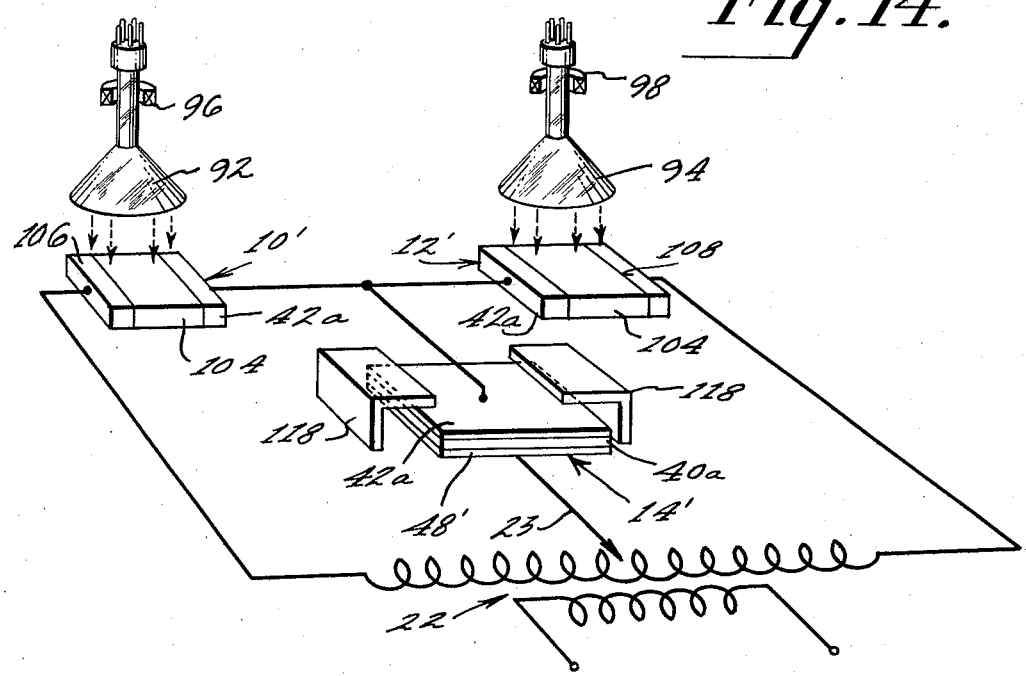

FIGS. 5, 7, and 9 are schematic illustrations of devices similar to that shown in FIG. 4 but depicting different forms of the invention;

FIGS. 6, 8 and 10 are fragmentary perspective views of panels similar to that of FIG. 3 but incorporating, respectively, the devices of FIGS. 5, 7 and 9;

FIG. 11 is a sectional view of a panel similar to that shown in FIG. 3 but illuminated by a pair of separate radiant energy sources;

FIG. 12 is a schematic illustration of one of the devices in the panel of FIG. 11;

FIG. 13 is a sectional view of a panel similar to that of FIG. 11, but illustrating yet another form of the invention, and FIG. 14 is a schematic illustration of one of the devices in the panel of FIG. 13.

Figure 1:
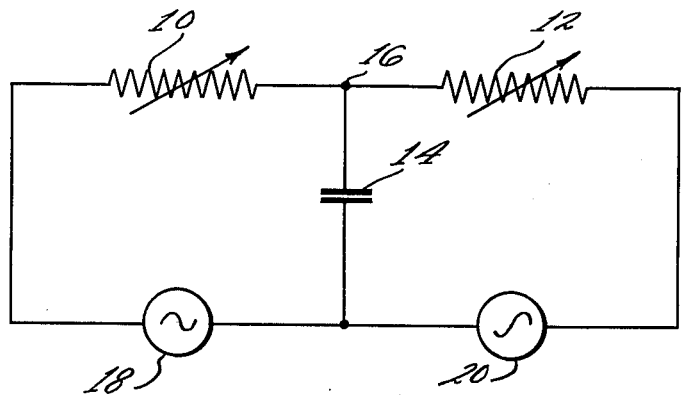
FIG. 1 is a schematic representation of the device of the invention and including an electroluminescent element and a pair of photoconductive elements.

Referring now to FIG. 1 there is shown a schematic representation of a single electroluminescent device or unit in accordance with the invention. The elementary unit comprises two photoconductive elements 10 and 12 and an electroluminscent element 14 with one terminal of each of said three elements connected in common to the junction 16. Each photoconductive element thus forms an electrical series circuit with the electroluminescent element, one of the circuits being made up of elements 10 and 14 and the other of the circuits being made up of elements 12 and 14. Each of the two circuits referred to is connected across an alternating current voltage source substantially 180° out of phase with the other. The 180 degree out-of-phase voltage sources are indicated generally by generators 18 and 20 and may be derived, for example, from opposite halves of a transformer secondary winding as illustrated by a transformer 22 in FIG. 2.

Figure 2:
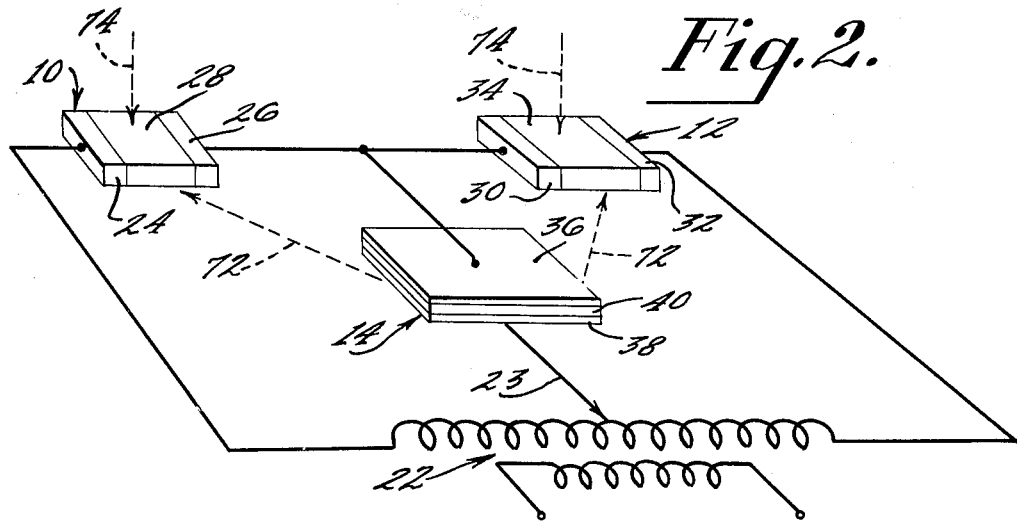
FIG. 2 is a schematic illustration of an electroluminescent device according to one form of the invention.

As illustrated in FIG. 2, the first photoconductive element 10 may comprise a pair of spaced apart conductors 24 and 26. The conductors are bridged by photoconductive material 28. Similarly, the second photoconductive element 12 is also comprised of a pair of spaced apart conductors 30 and 32 bridged by photoconductive material 34. The photosensitive materials 28 and 34 of the photoconductive elements 10 and 12 may comprise any of the known photoconductive materials sensitive to the type of radiant energy employed. Preferred materials having relatively high photoconductive sensitivities are cadmium sulphide and cadmium selenide powders, of the types disclosed in a co-pending application of Charles J. Busanovich and Soren M. Thomsen, Serial No. 472,354, filed December 1, 1954, now Patent No. 2,876,202, issued March 3, 1959, and assigned to the same assignee as the present application. The photoconductive powders may be mixed with a suitable dielectric binder such as, for example, ethyl cellulose, or an epoxy resin, or the powders may be applied without a binder.

The electroluminscent element 14 also includes a pair of spaced apart conductors 36 and 38, the electroluminescent material 40 being sandwiched between the conductors 36 and 38. The electroluminscent material may comprise any of the known electroluminescent phosphor materials such as, for example, a copper activated zinc sulphide phosphor or a manganese activated zinc selenide phosphor. The electroluminescent material is preferably laid down in the form of a layer and is preferably mixed with a dielectric material such as, for example, ethyl cellulose or polystyrene.

As indicated above, the two photoconductive elements 10 and 12 are connected in electrical series and with one terminal of the electroluminescent element 14 connected to the junction of the photoconductive elements. Consequently, while in FIG. 2 conductors 26, 30, and 36 are illustrated as being separate members connected together by wires, these members may instead be a common conductor. Such a common conductor 42 is illustrated in FIG. 3 where it will be described in greater detail in connection with a panel 44 of electroluminescent devices of the type described.

FIG. 3 shows an electroluminescent panel 44 of a type made up of a number of the elemental electroluminescent devices of FIG. 2. The panel, a portion of which is shown enlarged as through a magnifying glass 45, comprises first a substantially transparent substrate or support member 46. Over the support member 46 there is positioned a substantially transparent conductive coating 48 (which corresponds to the conductor 38 in the device of FIG. 2) and, over the coating 48, a layer of the electroluminscent phosphor material 40 referred to above. Over the electroluminescent phosphor material 40 there is disposed a plurality of spaced substantially transparent conductive elements 42 in substantially parallel rows. These elements will be described in greater detail in connection with FIG. 4. Each of these elements 42 is used to serve the combined function of conductors 26, 30, and 36 of FIG. 2. Over the transparent elements 42 and phosphor material 40 there is positioned a substantially transparent insulating layer 50 in the form of wedge shaped strips each straddling a pair of the adjacent rows of the elements 42. There is embedded in the transparent insulating layer 50 an opaque insulating material in the form of ribbons 61 running between adjacent rows of elements 42. These opaque ribbons serve to isolate, optically, each of the elemental photoconductive devices in the panel from the device adjacent to it. The insulating layer 50 thus formed has, on the side remote from the support member 46, a plurality of grooves 52 thereacross so as to form ridges between adjacent grooves 52. Both sides of each ridge are coated with a photoconductive material 54 and 56. The photoconductive material on one side of the ridges, say the right side of each ridge in the drawing, may be of one type of photoconductive material and the photoconductive material 54 on the other side of each of the ridges of a different type of photoconductive material for purposes which will be described below. Finally, conductive material 60 in the form of strips is positioned on the crests of the ridges of insulating material 50, each of the strips 60 being in electrically conductive contact with the photoconductive material on both sides of the one ridge on which the conductor 60 is positioned.

FIG. 3 illustrates a panel made up of a plurality of the devices of FIG. 2. Each discrete area of the panel being comprised of one of the devices. In FIG. 3, the first photoconductive element (numbered 10 in FIG. 2) of each pair of two photoconductive elements is comprised of two conductors, formed by a strip 60 and an adjacent conductor 42, and the photoconductive material 56 between these conductors; and the second photoconductive element of each pair (numbered 12 in FIG. 2) is positioned adjacent to the first photoconductive element of the pair and is comprised of two conductors, formed by the adjacent strip 60 and the same conductor 42, and photoconductive material 54 between these two conductors. Thus conductor 42 is common to both photoconductive elements while the conductors 60 are each part of adjacent photoconductive elements. The conductivity between the two conductors of each photoconductive element is determined by the amount of radiant energy impinging on the photoconductive material of the element. The electroluminescent element of each discrete area (numbered 14 in FIG. 2) comprises the common conductor 42 referred to, the portion of the substantially transparent conductive layer 48 adjacent to the common conductor 42, and the portion of the electroluminescent material 40 between these two conductors. The panel described thus comprises a plurality of pairs of photoconductive elements and one electroluminescent element for each pair of two photoconductive elements.

Adjacent conductors 60 of the photoconductive members are connected to opposite sides, respectively, of the secondary winding of a power transformer 22. The secondary winding has a tap connection 23, the winding may be center tapped or the tap 23 may be adjustable. The continuous layer conductor 48 of the electroluminescent element is connected to the tap 23 of the transformer 22. The transformer 22 is preferably one having a total alternating current secondary voltage of about from 1000 to 2000 volts, the exact voltage required is determined by the size of the photoconductive and the electroluminescent elements 10, 12, and 14. For example, the photoconductive elements may each have a gap width of .020 inch corresponding to the spacing between its conductors 42 and 60. The electroluminescent element may have a layer thickness or gap width, between its conductors 42 and 48, of about .001 inch to .003 inch.

In FIG. 4 there is illustrated the manner by which an electroluminescent panel 44, of the type shown in FIG. 3, is manufactured. First, there is disposed over the substantially transparent substrate 46 referred to (the substrate being preferably of a transparent material such as glass) a layer of a relatively transparent conductive material such as, for example, tin chloride or tin oxide. The layer 48 may be formed by evaporating metal, such as aluminum or gold, through a suitable mask. This is the layer that forms one of the two conductors of the electroluminescent element. Next, a layer of the electroluminescent phosphor material 40 is put down over the transparent conductive layer 48 in any conventional manner such as, for example, by printing, dusting, or settling out from a suspension. Then a number of spaced apart transparent conductors 42, in the form of relatively small area elements or squares are disposed on the electroluminescent layer 40, these conductors 42 are the common conductors referred to and form the common junction between the two photoconductive elements and the electroluminescent element of each electroluminescent device. The conductive squares 42 on the layer 40 may be of a material such as aluminum or gold and formed by a silk screening process or by evaporating metal through a suitable mask.

If adjacent photoconductive elements are to be optically shielded from each other, so as to avoid light contamination between adjacent devices in the panel, the opaque insulating ribbons 61 referred to are placed on the electroluminescent layer 40 and between adjacent conductive squares 42. The laying down of the opaque ribbons 61 is done before the next materials are put down on the panel being formed since the ribbons are to be embedded in the additional material to be laid down. Similarly, if a photoconductive member is to be optically shielded from the electroluminescent layer, which is desirable for certain purposes described below, opaque insulating material 68 may also be laid down on the electroluminescent layer 40 to shield that photoconductive member from light emitted by the layer 40.

The transparent insulating wedges 50 and the conductors 60 are next formed by first laying down a layer 50' of transparent insulating material, such for example as transparent polystyrene, and then laying down over the transparent conductive layer 50' a layer of conductive material 60'. The conductive material 60' may be of a material such as aluminum or gold. Then the undesired material is removed by an operation such as milling or scribing. The extent of the material removed is indicated in FIG. 4 by the space 64 between dashed lines 66. The portions of the transparent layer 50' remaining form the transparent insulating wedges 50 and the conductive material 60' remaining between adjacent cut-away spaces form the conductors 60.

Finally, photoconductive material is applied to the workpiece. The material may be applied by spraying a relatively fine photoconductive powder in a dielectric binder or by evaporation or sublimation. The photoconductive material is applied on the two exposed sides of the wedges 50. If two different types of photoconductive material are to be applied to the panel, one side of each wedge 50 is coated with one type of photoconductive material and the other side of each wedge is coated with the other type of photoconductive material.

The operation of the panel of FIG. 3 will now be described with the aid of FIG. 2. The photoconductive elements 10 and 12 of the electroluminescent units or devices of the panel, are of materials having different response time characteristics, respectively, and the panel is of a type responsive to a single source of radiant energy. The single source of radiant energy is illustrated schematically in FIG. 3 by a cathode ray tube 68 which may be part of a flying spot scanner system of which only a deflecting yoke 70 is shown.

Two types of photoconductive materials useful in the device of FIG. 3 are the cadmium sulphide and cadmium selenide referred to. The cadmium sulphide is of the type which, when subjected to light of two foot candles in brightness, exhibits a rise time from its non-conducting state to 50 percent of its ultimate conductiviy in about 250 milliseconds. The cadmium selenide is of the type which exhibits a rise time, under the same conditions, of about 5 milliseconds.

As illustrated in FIG. 2, both photoconductive elements 10 and 12 are positioned to receive feedback light (indicated schematically by dashed arrows 72) from the electroluminescent element 14. In the dark, with the alternating voltage on, the electroluminescent element will remain dark. If, now, an external trigger light (indicated generally by dashed arrows 74), such as that from the cathode ray tube 68 of FIG. 3 (light from the tube having a spectral distribution capable of exciting both photoconductive elements of each device), momentarily strikes both photoconductive elements 10 and 12, the photoconducive element 10 having the faster response time will rapidly become conducting. This causes the electroluminescent element to luminesce since current from the supply source 22 now flows through the photoconductive element 10 and the electroluminescent element 14. Since light from the electroluminescent element 14 feeds back to the photoconductive element 10, the electroluminescent element remains luminescent even after the external trigger light has been removed. At the end of the predetermined time delay (about a quarter of a second when the photoconductive material of the second element 12 is cadmium sulphide) the second photoconductive element 12 attains its conducting state, the second element having been energized during the quarter second delay by feedback light 72 from the electroluminescent element 14. Current substantially 180° out of phase with that flowing through the first photoconductive element and the electroluminescent element is now passed through the second photoconductive element and the electroluminescent element. This 180° out of phase current reduces the voltage across the electroluminescent element to substantially zero. This, in turn, results in an extinguishing of the electroluminescent element thus cutting off the feedback action between both photoconductive elements 10 and 12 and the electroluminescent element 14. The device will now remain dark until again triggered into luminescence by external light.

A panel made up of a number of devices, each like the one described, is useful in applications such as a moving target indicator. If an image of a moving target were projected onto the panel 44 of FIG. 3, the moving target would leave a trail having elemental trail areas which would luminesce for about a quarter of a second. Stationary targets, however, would feed a substantially continuous signal to both photoconductors and (after an initial quarter second luminescence) become dark by virtue of the continuous exposure to light of the second photoconductive element of each device in the panel representing the stationary targets.

While described with reference to a panel of electroluminescent devices, a single device may be used as, for example, a photoresponsive switch. When a triggering light of substantially any duration is applied to the device, the device will luminesce (and thus pass current) for only a predetermined time interval, the interval being about a quarter second for devices using photoconductive materials of the type referred to. Such a switch can be used, for example, for controlling the duration of the "on" time of a load (not shown) connected in series between the electroluminescent element 14 and the tap 23.

As indicated before, the tap 23 of the secondary side of the transformer 22 may be made adjustable. Consequently, an appropriate setting of the tap may be made to compensate for a difference in photosensitivity of the photoconductive elements by an appropriate adjustment of the relative voltages applied across the elements. In general, if a greater voltage is applied across the first photoconductive element 10 (the element having the faster response time) than across the second photoconductive element 12, the feedback effect referred to will be triggered on with a lower intensity external light and the duration of luminescence will be increased. If a greater voltage is applied across the second photoconductive element 12 than to the first photoconductive element 10, more intense triggering light will be required and the duration of luminescence will be decreased. In order to reduce the time lapse between successive cycles of luminescence and erasure, the decay time of the second photoconductive element 12 should be relatively short as compared with its rise time.

Referring now to FIG. 5 there is illustrated an electroluminescent device useful, when a number of such devices are assembled to form the panel 76 shown in FIG. 6 (one device for each elemental area of the panel), as another type of moving target indicator. The panel of FIG. 6 displays only a portion of the path or trail of a moving target. The devices of FIGS. 5 and 6 are of a type similar to that of FIGS. 2 and 3 with the exception that the devices of FIGS. 5 and 6 have an internal shield 68 positioned between the second photoconductive element 12 and the electroluminescent element 14. This shield 68 prevents light from the electroluminescent element 14 from reaching the second photoconductive element 12. As in the devices of FIGS. 2 and 3, the first photoconductive element 10 has a faster response time (say .005 second) than the response time (say .250 second) of the second element.

In operation, if radiant energy (represented by dashed line arrows 74) representing a target image from a source (not shown) is projected onto both photoconductive elements (FIGS. 5 and 6), the first element 10 will become conductive after a relatively short time. This will cause the electroluminescent element 14 to luminesce. Once the electroluminescent element becomes luminescent, it will remain luminous even if the radiant energy from the outside source is removed. This is so because the photoconductive element 10 is in regenerative feedback relation with the electroluminescent element. Now, there are instances where the flow of energy from the outside source ceases before the second photoconductive element can attain its conductive state. One such case is where the energy source is light from a flying spot scanner cathode ray tube displaying a moving target, and where the target image activates the faster response photoconductive elements (the first photoconductive elements) but does not remain in any one location on the face of the tube for a length of time sufficient to activate a slow response photoconductive element (the second photoconductive elements) at a position corresponding to the one location. In such a case the moving target successively energizes each electroluminescent device in a panel of such devices and leaves a trail of continuously luminescing devices as distinguished from the disappearing trail in the devices of FIGS. 2 and 3. The activated devices indicate the path of the moving target. However, if the cathode ray tube energy source referred to also displays a fixed background pattern or picture, each elemental area of light from the background image will activate first the faster of the two photoconductive elements (causing the electroluminescent element to luminesce) and then the adjacent slower photoconductive element (causing the electroluminescent element to become dark). Thus the background image will cease to be displayed on the panel of electroluminescent devices; only the entire trail of the moving target will be displayed.

The structure of the device of FIG. 7, and the panel 78 of FIG. 8 which comprises a number of the devices of FIG. 7 (one device for each elemental area of the panel) differs from those of FIGS. 2 and 3 (and from those of FIGS. 5 and 6) in that one of the photoconductive elements 12 is shielded, as by a shield 80, from external radiant energy 74. Both of the photoconductive elements 10 and 12 are in optical feedback relation with the electroluminescent element 14.

In operation, light 74 falls on only one of the photoconductive elements 10. When this element 10 attains its conductive state the electroluminescent element 14 is activated to luminescence. Light 72 from this element 14 causes the second photoconductive element 12 to be activated. This causes the electroluminescent element to become dark. Since the first and second photoconductive elements 10 and 12 are successively activated, the same photoconductive material may be used for these elements. Of course, different photoconductive materials may instead be used for the first and second photoconductive elements.

These devices are useful for storing a signal in luminescent form for a predetermined length of time, as determined by the response time of the second photoconductive element 12, and then automatically erasing the stored information. However, the devices of FIGS. 7 and 8 are capable of storing information for a greater period of time than those of FIGS. 2 and 3. In addition, the devices of FIGS. 7 and 8 are simpler of manufacture in that the same photoconductive material may be used in both of the photoconductive elements 10 and 12 of these devices.

Each of the electroluminescent elements 14 of the devices of FIGS. 2, 3, and 5 through 8 are capable only of either displaying its maximum luminosity or remaining dark, no gradation of light being displayable. This is due to the feedback relation between the first photoconductive element 10 and the electroluminescent element 14. While this completely-bright-or-completely-dark phenomenon is useful in that it makes the device sensitive to relatively low intensity radiant energy signals, no gradations of brightness or half-tones can be displayed. However, it is often desirable to display differences in brightness on the device to correspond to differences in brightness of the source. FIGS. 9 and 10 illustrate electroluminescent devices capable of displaying half-tones.

FIG. 9 illustrates a device similar to that of FIG. 7 but which is capable of displaying half-tones. The first photoconductive element 10, in the device of FIG. 9, is shielded from illumination from the electroluminescent element 14 but is exposed to external light. The other photoconductive element 12 is shielded from external light but is in optical feedback relation with the electroluminescent element 14. The photoconductive material of each of the photoconductive elements may be of the same or of different materials. In operation, light 74 from the external source (not shown) impinges on the first photoconductive element and causes its resistance to decrease in proportion to the intensity of the light which causes the electroluminescent element 14 to luminesce. Consequently, the brightness of the electroluminescent element 14 is a function of the light reaching the photoconductive element 10. When the electroluminescent element 14 luminesces, the second photoconductive element is iluminated. After an interval of delay, which is dependent upon the rise time characteristic of the photoconductive material used, the second photoconductive element 12 will become conductive and the electroluminescent element will be extinguished, that is, will again become dark.

The panel of FIG. 10, which comprises a number of the devices of FIG. 9, is similar in structure to the panel of FIG. 8, but with the addition of opaque insulating material 68' on the phosphor layer 40 and half portions of the conductive elements 42, to shield those portions of the photoconductive layer 56 corresponding to the photoconductive element 10 of FIG. 9 from the electroluminescent layer.

According to another form of the invention the first and second photoconductive elements of each unitary electroluminescent device are controlled by separate light sources. This may be accomplished by either having separate light sources coming from different directions, all of the first photoconductive elements being shielded from the light source of the second elements and all of the second elements shielded from the light source of the first elements. Alternatively, instead of having the light directed from two different directions, the light from the two sources may come from the same direction but each source providing a light of a different color. In this case, the first and second photoconductive elements face in the same direction but each is sensitive only to light from a different one of the sources. The two light sources then each provide the appropriate color for the photoconductive elements which it is to activate.

FIG. 11 illustrates an electroluminescent panel 82 comprised of a number of elemental electroluminescent devices, one device (illustrated in FIG. 12) for each elemental area of the panel, and in which the separate electroluminescent devices may be switched on or off, for respectively displaying or erasing information. The switching is accomplished by means of light beams 84 and 86, focused by lenses 88 and 90, from separate radiant energy sources 92 and 94 such as cathode ray tubes of flying spot scanner systems (of which only the cathode ray tube deflecting yokes 96 and 98 are shown).

The panel 82, which is similar to the panel 44 of FIG. 3, is comprised of a substantially transparent substrate 46'. Over the substrate 46' there is disposed a relatively transparent conductive layer 48', which acts as one terminal of each of the electroluminescent elements (one of the elements 14 being illustrated in FIG. 14) in the panel 82, and, over the transparent layer 48', a layer 40' of electroluminescent material. Then, over the electroluminescent layer 40', there is positioned a number of rows of spaced apart conductors 42' each in the form of relatively small area elements or squares which are similar to the squares 42 shown in FIG. 3. Each of the spaced apart conductors 42' forms the second terminal of one of the electroluminescent elements referred to and is divided into two side-by-side halves. One half 100 of each conductor 42' is of a transparent conductive material such as tin chloride or tin oxide and the other half 102 of each conductor 42' is of an opaque conductive material such as an opaque layer of aluminum or gold. A number of prism-shaped wedges 104 of a single type of photoconductive material is positioned on the assembly described. The wedges 104 are arranged in parallel spaced apart rows with the groove between adjacent wedges adjacent to the dividing line between the transparent half 100 and the opaque half 102 of the conductive squares 42'. Finally, there is disposed, at the crests of each of the wedges 104, a conductor 106 and 108. The wedges 104 of the photoconductive material and the conductors 106 and 108 are made in a manner similar to that described in FIG. 4 with respect to the formation of the ridges 50 of transparent insulating material each capped with conductors 60. The panel thus formed comprises a number of pairs of photoconductive elements 10' and 12' and, for each pair, an electroluminescent element 14'. One of the photoconductive elements 10' of each pair is comprised of one of the conductors 106 at the crest of a wedge 104, the transparent half 100 of an adjacent conductive square 42', and the portion of the wedge 104 of photoconductive material between the two conductors 100 and 106. Similarly, the other photoconductive element 12' of each pair is comprised of a conductor 108 at the crest of the wedge 104 adjacent to the wedge of the first photoconductive element 10', the opaque half 102 of an adjacent conductive square 42', and the portion of the wedge 104 of photoconductive material between the two conductors 102 and 108. Each of the electroluminescent elements 14' is comprised of one of the conductive squares 42', the portion of the conductive layer 48' adjacent to the square, and the portion of the electroluminescent material 40' between the square and the adjacent conductive layer portion.

Adjacent conductors 106 and 108 of the photoconductive elements 10' and 12' are connected to opposite sides of the secondary winding of the power transformer 22. The conductor 48' of the electroluminescent element 14' is connected to the tap 23 of the transformer.

Reference will now be made to FIG. 12 for an explanation of the operation of the panel of FIG. 11. As indicated in FIGS. 11 and 12, one of the photoconductive elements 12' of each pair 10' and 12' is shielded from its adjacent electroluminescent element 14' by virtue of the opacity of one half 102 of the conductive square 42'. This shielding is illustrated schematically in FIG. 12 by a shield 110. The other photoconductive element 10' is positioned to receive feedback light 72 from the electroluminescent element 14'.

Light 84 originating from one light source 92 is allowed to illuminate only one photoconductive element 10' of each electroluminescent device in the panel and light 86 from the other light source 94 is allowed to illuminate only the other photoconductive element 12' of each device. This may be accomplished by having each of the light sources 92 and 94 direct light in a direction onto the faces 112 or 114 on one side of each wedge 104, the light missing the other faces 114 or 112, respectively, of each wedge. Consequently, light from each source can reach only one of the photoconductive elements of each pair. An apertured mask 116 may be used to insure the restriction of light from each source to only its corresponding photoconductive elements.

Alternatively, to achieve a restriction of each light source to only desired elements, the photoconductive elements 10' and 12' may be made of photoconductive materials sensitive to different colors. The photoconductive material of each element is chosen of a type insensitive to light of the color to which the photoconductive material of the other element is sensitive. Light of the appropriate color from each source can then be directed onto the entire panel and still control only the desired photoconductive elements. When a different photoconductive material is used for each of the two sets 10' and 12' of photoconductive elements, the photoconductive elements may be made in the manner described with respect to FIGS. 3 and 4 where different photoconductive materials 52 and 54 are incorporated in a panel having transparent wedge-shaped supports 50 with the photoconductive materials deposited on the supports. Where photoconductive materials are used having sensitivities to different colors, the photoconductive material of one photoconductive element 10' of each pair may be comprised of the cadmium sulphide described, which responds to light of a wave length in the vicinity of 6000 angstrom units. The photoconductive material of the second photoconductive element may be comprised of the cadmium selenide described, which responds to light of a wave length in the vicinity of 9000 angstrom units and is relatively insensitive to light of a wave length of 6000 angstrom units, the cadmium sulphide being relatively insensitive to light of 9000 angstrom units. Thus the first photoconductive elements may be activated by a source of light of a wave length of about 6000 angstrom units while the second photoconductive element may be activated by a second source of light of a wave length about 9000 angstrom units.

As shown in FIG. 12, when light from one source 64 impinges on a first photoconductive element 10', the electroluminescent element 14' will be illuminated. Since the first element 10' is in feedback relation with the electroluminescent element 14', the latter will remain luminescent even after the light source 92 no longer illuminates the first photoconductive element 10'. The luminescence of the device represents a storage of a signal in visible form. If it is desired that the stored signal be erased, light 86 from the second source 94 is directed onto the second photoconductive element 12' of the device. This causes out-of-phase current from the transformer 22 to flow through the electroluminescent element. The electroluminescent element goes dark and the previously stored signal has now been erased.

FIGS. 13 and 14 illustrate still another form of the invention. The devices of these figures are similar to those described in, respectively, FIGS. 11 and 12. As shown in FIG. 14, both of the photoconductive elements 10' and 12' of the device may be shielded from the electroluminescent element 14'. This shielding effect, illustrated by shields 118, may be accomplished by making both halves of the conductive squares 42a, FIG. 13 (corresponding to the conductive squares 42' of FIG. 11), of an opaque material. In such a case, when either of the light sources 92 and 94 illuminates its photoconductive element 10' or 12', the electroluminescent element 14' will luminesce, but only for as long as one of the photoconductive elements is illuminated. When both photoconductive elements are illuminated the luminescent element 14' is extinguished. A panel 120 (FIG. 13) made up of a number of the electroluminescent devices of FIG. 14 (one of the devices for each elemental area of the panel) is adapted to be put to such uses as image comparison apparatus where each of the images to be compared is projected onto the photoconductive elements of one of the pairs 10' or 12' of elements. Where the two images overlap, and are of substantially equal brightness, both photoconductive elements of each pair will be illuminated causing that elemental area to remain dark. But where one or the other of the images impinges on only one of the photoconductive elements of a device, or where the two images are of unequal intensity, the elemental area represented by that device will luminesce.

From the foregoing it will be apparent that the invention provides an improved electroluminescent device which is capable of selectively storing a signal in luminescent form and of selectively erasing the stored signal.

What is claimed is:

1. An electroluminescent device comprising two photoconductive elements, at least one of said photoconductive elements being exposed to radiant energy from a direction external of said device, an electroluminescent element, at least one of said photoconductive elements being exposed to radiant energy from said electroluminescent element, and low impedance means directly connecting one side of said electroluminescent element and one side of each of said photoconductive elements together.

2. The invention as in claim 1, wherein both of said photoconductive elements are exposed to radiant energy from said electroluminescent element.

3. The invention as in claim 1, wherein both of said photoconductive elements are exposed to external radiant energy.

4. The invention as in claim 3, wherein both of said photoconductive elements are exposed to radiant energy from said electroluminescent element and said photoconductive elements have different time response characteristics.

5. The invention as in claim 1, further including means for impressing a first alternating current voltage across the other side of said electroluminescent element and the other side of one of said photoconductive elements, and means for impressing across said other side of said electroluminescent element and the other side of said other photoconductive element an alternating current voltage which is 180° out of phase with said first voltage.

6. An electroluminescent device comprising a transparent support member, a transparent conductive coating on said support member, a layer of electroluminescent phosphor material on said coating, a plurality of mutually insulated substantially transparent conductive elements on said phosphor layer, a plurality of pairs of photoconductive elements with portions of each pair in electrical contact with one of said conductive elements, at least one of the photoconductive elements of each pair being exposed to radiant energy external of said device, and at least one of said photoconductive elements being exposed to radiant energy from said phosphor layer, the photoconductive elements of each pair having terminals mutually insulated from each other and from said conductive coating for applying different voltages to said terminals with respect to said conductive coating.

7. An electroluminescent device comprising a transparent support member, a transparent conductive coating on said support member, a layer of electroluminescent phosphor material on said coating, a plurality of mutually insulated substantially transparent conductive elements on said phosphor layer, a plurality of pairs of photoconductive elements with portions of each pair in electrical contact with one of said conductive elements, both photoconductive elements of each pair being exposed to radiant energy external of said device and to radiant energy from said phosphor layer, and said photoconductive elements of each pair having different time response characteristics, the photoconductive elements of each pair having terminals mutually insulated from each other and from said conductive coating for applying different voltages to said terminals with respect to said conductive coating.

8. An electroluminescent device comprising two photoconductive elements, at least one of said photoconductive elements being exposed to radiant energy from a direction external of said device, an electroluminescent element, one of said photoconductive elements being exposed to radiant energy from said electroluminescent element and the other one of said photoconductive elements being shielded from radiant energy from electroluminescent element, and low impedance means connecting one side of said electroluminescent element and one side of each of said photoconductive elements together.

9. The invention as in claim 8, wherein both of said photoconductive elements are exposed to external radiant energy.

10. The invention as in claim 9, further including means for impressing a first alternating current voltage across the other side of said electroluminescent element and the other side of one of said photoconductive elements, means for impressing across said other side of said electroluminescent element and the other side of said other photoconductive element an alternating current voltage which is 180° out of phase with said first voltage, and said photoconductive element which is shielded from said electroluminescent element having a longer time response characteristic than the one which is exposed to said electroluminescent element.

11. An electroluminescent device comprising a transparent support member, a transparent conductive coating on said support member, a layer of electroluminescent phosphor material on said coating, a plurality of mutually insulated substantially transparent conductive elements on said phosphor layer, a plurality of pairs of photoconductive elements with portions of each pair in electrical contact with one of said conductive elements, both photoconductive elements of each pair being exposed to radiant energy external of said device, one of the photoconductive elements of said pair being exposed to radiant energy from said phosphor layer and the other one being shielded from radiant energy from said phosphor layer, and said photoconductive element which is shielded from said phosphor layer having a longer time response characteristic than the one which is exposed to said phosphor layer, the photoconductive elements of each pair having terminals mutually insulated from each other and from said conductive coating for applying different voltages to said terminals with respect to said conductive coating.

12. An electroluminescent device comprising two photoconductive elements, one of said photoconductive elements being exposed to radiant energy from a direction external of said device and the other one of said photoconductive elements being shielded from said external radiant energy, an electroluminescent element, at least one of said photoconductive elements being exposed to radiant energy from said electroluminescent element, and low impedance means connecting one side of said electroluminescent element and one side of each of said photoconductive elements together.

13. The invention as in claim 12, wherein both of said photoconductive elements are exposed to radiant energy from said electroluminescent element.

14. The invention as in claim 13, and further including means for impressing a first alternating current voltage across the other side of said electroluminescent element and the other side of one of said photoconductive elements, and means for impressing across said other side of said electroluminescent element and the other side of said other photoconductive element an alternating current voltage which is 180° out of phase with said first voltage.

15. An electroluminescent device comprising a transparent support member, a transparent conductive coating on said support member, a layer of electroluminescent phosphor material on said coating, a plurality of mutually insulated substantially transparent conductive elements on said phosphor layer, a plurality of pairs of photoconductive elements with portions of each pair in electrical contact with one of said conductive elements, one photoconductive element of each pair being exposed to radiant energy external of said device and the other photoconductive element being shielded from said external radiant energy, and both photoconductive elements of each pair being exposed to radiant energy from said phosphor layer, the photoconductive elements of each pair having terminals mutually insulated from each other and from said conductive coating for applying different voltages to said terminals with respect to said conductive coating.

16. An electroluminescent device comprising first and second photoconductive elements and an electroluminescent element, and low impedance means connecting one side of said electroluminescent element and one side of each of said photoconductive elements together, said first photoconductive element being exposed to and said second photoconductive element being shielded from radiant energy from a direction external of said device, and first photoconductive element being shielded from and said second photoconductive element being exposed to radiant energy from said electroluminescent element.

17. The invention as in claim 16, further including means for impressing a first alternating current voltage across the other side of said electroluminescent element and the other side of said first photoconductive element, and means for impressing across said other side of said electroluminescent element and the other side of said second photoconductive element an alternating current voltage which is 180° out of phase with said first voltage.

18. An electroluminescent device comprising a transparent support member, a transparent conductive coating on said support member, a layer of electroluminescent phosphor material on said coating, a plurality of mutually insulated substantially transparent conductive elements on said phosphor layer, a plurality of pairs of photoconductive elements with portions of each pair in electrical contact with one of said conductive elements, a first photoconductive element of each pair being exposed to and a second photoconductive element of said pair being shielded from radiant energy from a direction external of said device, and said first photoconductive element being shielded from and said second photoconductive element being exposed to radiant energy from said phosphor layer, the photoconductive elements of each pair having terminals mutually insulated from each other and from said conductive coating for applying different voltages to said terminals with respect to said conductive coating.

19. An electroluminescent device comprising first and second photoconductive elements, an electroluminescent element, said first photoconductive element being exposed to radiant energy from said electroluminescent element and said second photoconductive element being shielded from radiant energy from said electroluminescent element, low impedance means connecting one side of said electroluminescent element and one side of said photoconductive elements together, first and second radiant energy sources, said device being constructed and arranged such that said first photoconductive element is responsive to said first source but not to said second source and said second photoconductive element is responsive to said second source but not to said first source.

20. The invention as in claim 19, and further including means for impressing a first alternating current voltage across the other side of said electroluminescent element and the other side of said first photoconductive element, and means for impressing across said other side of said electroluminescent element and the other side of said second photoconductive element an alternating current voltage which is 180° out of phase with said first voltage.

21. Electroluminescent apparatus comprising a device including a transparent support member, a transparent conductive coating on said support member, a layer of electroluminescent phosphor material on said coating, a plurality of mutually insulated substantially transparent conductive elements on said phosphor layer, a plurality of pairs of photoconductive elements with portions of each pair in electrical contact with one of said conductive elements, a first one of the photoconductive elements of each pair being exposed to radiant energy from said phosphor layer and a second one of the photoconductive elements of said pair being shielded from radiant energy from said phosphor layer, the photoconductive elements of each pair having terminals mutually insulated from each other and from said conductive coating for applying different voltages to said terminals with respect to said conductive coating, first and second radiant energy sources; an apertured mask intermediate said device and said radiant energy sources and so positioned that all of said first photoconductive elements are exposed to said first source but not to said second source, and all of said second photoconductive elements are exposed to said second source but not to said first source.

22. An electrical circuit comprising a network having three branches, one terminal of each branch being connected to a common terminal point, each of said branches containing an electrical impedance element, the circuit element in one of said branches comprising an electroluminescent cell, the circuit element in another of said branches comprising a photoconductive element, the electrical impedance of which varies as a function of radiation emitted from said electroluminescent cell, said electroluminescent cell and said photoconductive element being positioned in spaced relation and in radiation coupled relationship, the radiation from said electroluminescent cell being of low brightness when said circuit is in one stable operating condition, and of high brightness when said circuit is in another stable operating condition.

References Cited by the Examiner

UNITED STATES PATENTS 2,773,992  12/1956  Ullery _____ 250—213

OTHER REFERENCES

Bramley: "Transient Voltage Indicator and Information Display Panel," Review of Scientific Instruments, June 1953, pages 471–472.

RALPH G. NILSON, *Primary Examiner.*

R. A. MILLIKEN, C. R. CAMPBELL, A. GAUSS, W. STOLWEIN, *Assistant Examiners.*